(12) United States Patent
Guo

(10) Patent No.: US 7,755,882 B2
(45) Date of Patent: Jul. 13, 2010

(54) HOUSING ASSEMBLY AND METHOD OF ASSEMBLING THE ASSEMBLY

(75) Inventor: Shi-Kun Guo, Guangdong (CN)

(73) Assignees: Hong Fu Jin Precision Industry (Shen Zhen) Co., Ltd., Longhua Town, Bao'an District, Shenzhen, Guangdong Province; Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 1013 days.

(21) Appl. No.: 11/309,407

(22) Filed: Aug. 4, 2006

(65) Prior Publication Data

US 2008/0040884 A1    Feb. 21, 2008

(51) Int. Cl.
*G06F 1/16* (2006.01)

(52) U.S. Cl. ............... 361/679.09; 361/679.26; 361/679.27; 720/605

(58) Field of Classification Search ........... 720/605; 369/75.11; 361/679.11, 679.12
See application file for complete search history.

(56) References Cited

U.S. PATENT DOCUMENTS

| | | | | |
|---|---|---|---|---|
| 5,265,083 A | * | 11/1993 | Ishii et al. | 720/605 |
| 5,355,357 A | * | 10/1994 | Yamamori et al. | 720/646 |
| D370,216 S | * | 5/1996 | Kondo | D14/319 |
| 5,572,399 A | * | 11/1996 | Shirato et al. | 361/679.09 |
| 5,576,929 A | * | 11/1996 | Uchiyama et al. | 361/679.58 |
| 5,870,367 A | * | 2/1999 | Yamamori | 720/669 |
| 6,307,736 B1 | * | 10/2001 | Song et al. | 361/679.09 |
| 6,731,581 B2 | * | 5/2004 | Huang | 720/655 |
| 6,772,422 B2 | * | 8/2004 | Yano et al. | 720/600 |
| 6,795,381 B2 | * | 9/2004 | Ando et al. | 369/30.03 |
| 6,813,147 B2 | * | 11/2004 | Jeong | 361/679.06 |
| 7,024,674 B2 | | 4/2006 | Shepherd et al. | |
| 7,089,572 B2 | * | 8/2006 | Yano et al. | 720/655 |
| 7,280,345 B2 | * | 10/2007 | Park | 361/679.01 |
| 7,433,181 B2 | * | 10/2008 | Homer et al. | 361/679.55 |
| 7,574,715 B2 | * | 8/2009 | Springer et al. | 720/647 |
| 2003/0193773 A1 | * | 10/2003 | Choi | 361/683 |
| 2004/0141284 A1 | * | 7/2004 | Chen et al. | 361/681 |
| 2004/0218517 A1 | * | 11/2004 | Yano et al. | 369/292 |
| 2005/0025466 A1 | | 2/2005 | Yen et al. | |
| 2005/0207104 A1 | | 9/2005 | Love | |
| 2006/0044743 A1 | * | 3/2006 | Ito et al. | 361/681 |
| 2006/0133024 A1 | * | 6/2006 | Kim et al. | 361/683 |
| 2006/0209500 A1 | * | 9/2006 | Park | 361/679 |
| 2007/0240177 A1 | * | 10/2007 | Matsui | 720/697 |

* cited by examiner

*Primary Examiner*—Jayprakash N Gandhi
*Assistant Examiner*—Anthony Q Edwards
(74) *Attorney, Agent, or Firm*—Winston Hsu (57) ABSTRACT

A housing assembly includes a base body. The base body includes a plate having a mounting side, and a cover member. An opening is defined in the plate, the opening has a first end portion adjacent to the mounting side and an opposite second end portion communicating with the first end portion. The cover member is inserted into and partially shields the opening, the first end portion and a side of the cover member at the first end portion cooperatively define a fixing hole for allowing a hinge module to extend therethrough.

19 Claims, 10 Drawing Sheets

HOUSING ASSEMBLY AND METHOD OF ASSEMBLING THE ASSEMBLY

FIELD OF THE INVENTION

The present invention relates to housing assemblies and, more particularly, to a housing assembly having a shielding structure and a method of assembly the same.

DESCRIPTION OF RELATED ART

Display panels, printed circuit boards and the like used in electronic devices, such as mobile phones, notebook computers, or portable disk players, are generally protected by various housing assemblies for water-resistance, dust-proof and etc.

A general housing assembly adopted in a foldable disk player is used as an example for illustration. The housing assembly includes a base, a cover, and a hinge unit. The base and the cover are coupled to each other via the hinge unit.

The base includes an upper case and a lower case secured to the upper case. The upper case includes a plate and a rear wall perpendicularly extends from a rear side of the plate. The hinge unit is in a horizontal H-shape, and includes a shaft, a fixing sheet, and a pintle. The shaft and the fixing sheet are parallel to each other, and separately arranged at two opposite ends of the pintle. The pintle substantially perpendicularly interconnects the shaft and the fixing sheet. The shaft is positioned in the cover whilst the fixing sheet is mounted to the base. The cover can thus be rotated around axial directions of the shaft and the pintle, and be positioned at specific angles. It is convenient for users to view the panel at different angles.

However, the hinge unit has generally been adjusted to satisfy various mechanical characteristic requirements before shipment. The hinge unit is sold as a whole and generally adopted in the housing assembly without being disassembled. A part of the rear wall attached to the base is designed to be removable so that the fixing sheet can thus be inserted therethrough and mounted to the base. Aesthetic feeling of the base is adversely affected because there are slits in the rear wall facing outside. Moreover, strength of the rear wall is reduced.

Therefore, a housing assembly with a shielding structure and a high strength is desired.

SUMMARY OF THE INVENTION

In one aspect, a housing assembly includes a base body. The base body includes a plate having a mounting side, and a cover member. An opening is defined in the plate, the opening has a first end portion adjacent to the mounting side and an opposite second end portion communicating with the first end portion. The cover member is inserted into and partially shields the opening, the first end portion and a side of the cover member at the first end portion cooperatively define a fixing hole for allowing a hinge module to extend therethrough.

In another aspect, a housing assembly includes a primary housing, a secondary housing and a hinge module. The primary housing includes a plate having a mounting side, and a cover member. An opening is defined in the plate, and the opening has a first end portion adjacent to the mounting side. The cover member is inserted into and partially shields the opening. The hinge module pivotally interconnects the primary housing and the secondary housing. The hinge module is inserted through the opening and engages with the secondary housing in a manner so as to prevent the hinge module from becoming disengaged from the opening.

In still another aspect, a method of assembling a housing assembly includes steps of: providing a base body having a plate having a mounting side, an opening being defined in the plate, the opening having a first opening portion adjacent to the mounting side, and a second opening portion communicating with the first opening portion; receiving a hinge module through the second opening portion with a pintle of the hinge module being received in the second opening portion and a fixing member being received in the base, the fixing member being mounted to the pintle; moving the pintle from the second opening portion to the first opening portion along the opening; mounting a cover member to the plate in a manner so as to shield the opening; and securing the fixing member to the base body in a manner so as to prevent the pintle from becoming disengaged from the opening.

Other advantages and novel features will become more apparent from the following detailed description of preferred embodiments when taken in conjunction with the accompanying drawings, in which:

DETAILED DESCRIPTION OF THE INVENTION

In the following embodiments, a housing assembly of a portable disk player is used as an example for illustration. It is noted that housing assemblies in these embodiments may be housing assemblies of notebook computers, mobile phones, or any other electronic apparatuses.

Figure 1:
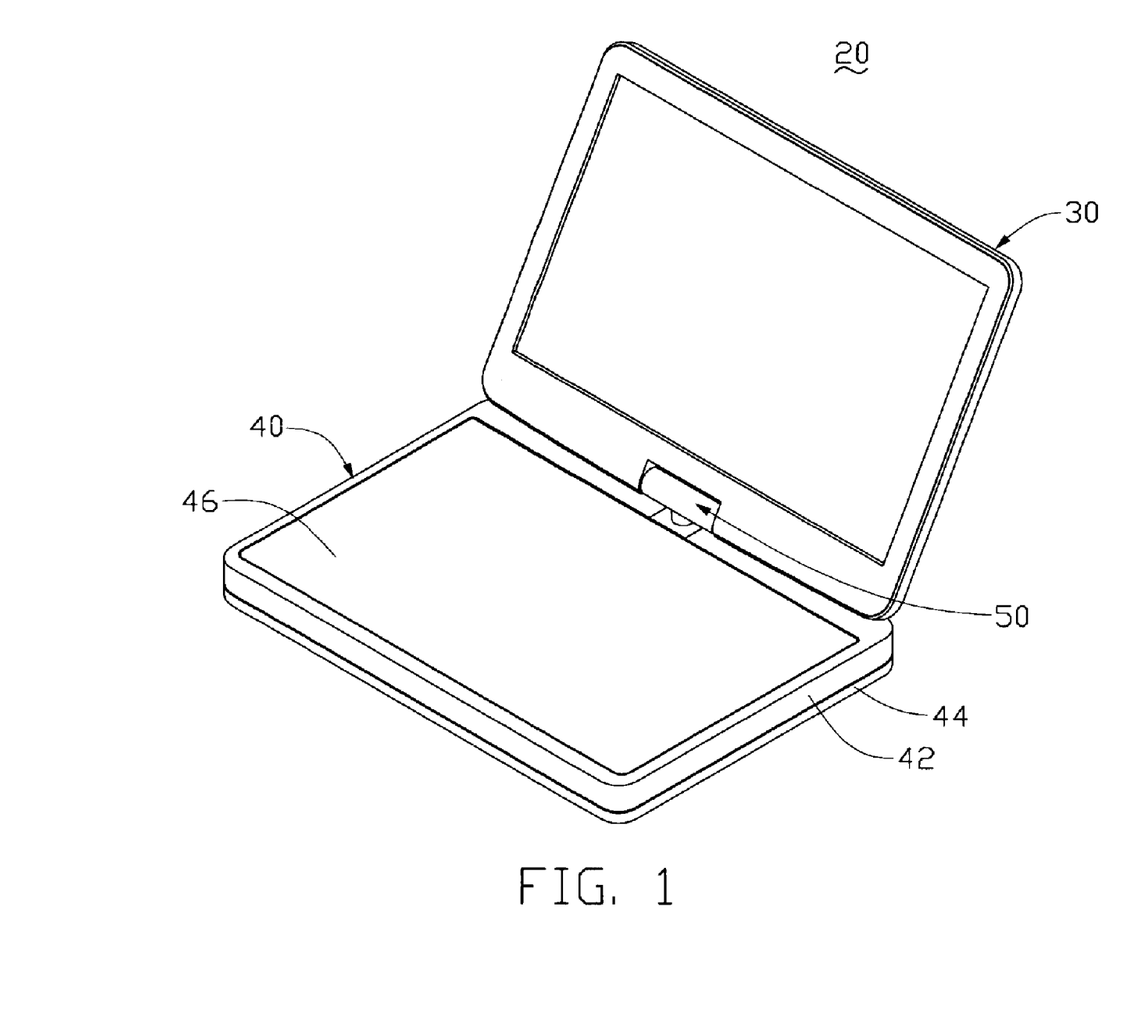
FIG. 1 is an isometric view of a housing assembly of a portable disk player in accordance with an exemplary embodiment.

Referring to FIG. 1, a housing assembly 20 according to a preferred embodiment is illustrated. The housing assembly 20 includes a cover 30, a base 40, and a hinge module 50. The cover 30 is pivotally coupled to the base 40 via the hinge module 50. The cover 30 is capable of accommodating a panel that can display pictures and images for viewing. The base 40 accommodates various components for receiving and driving a disk (not shown) loaded therein, reproducing signals from the disk.

Figure 2:
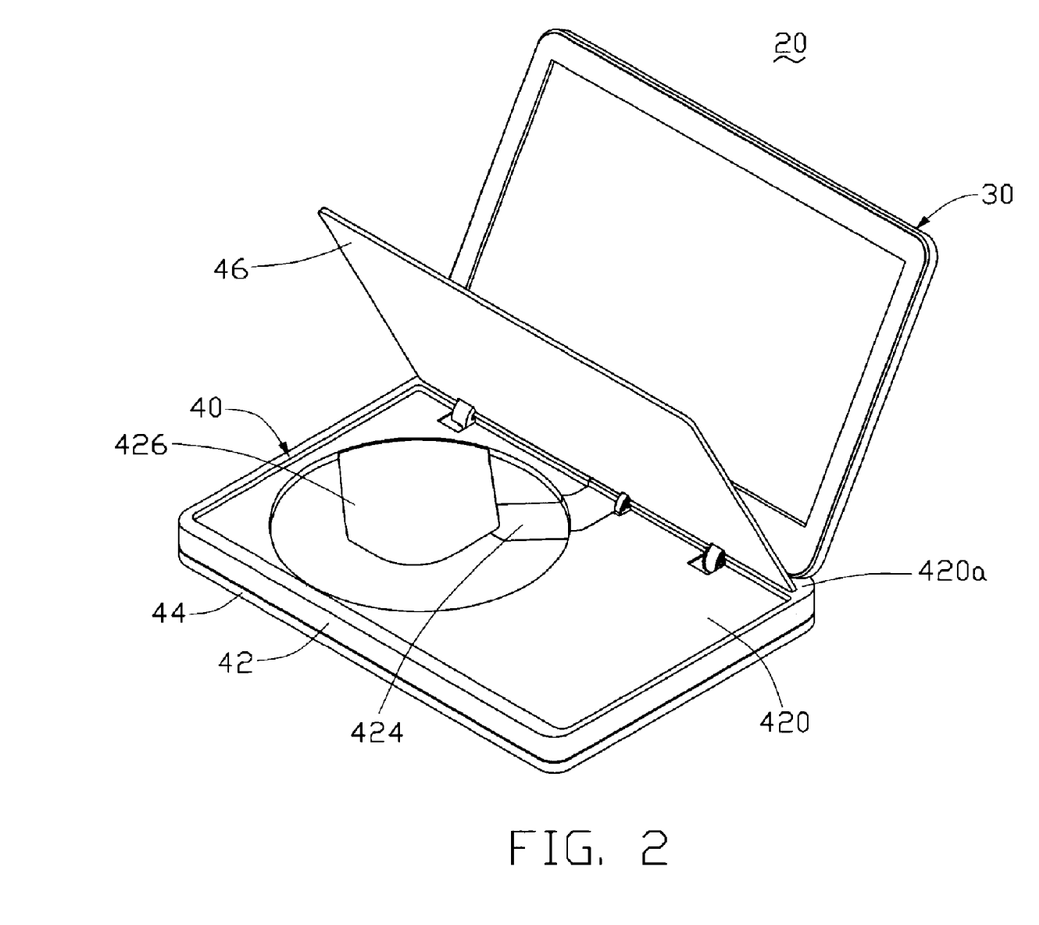
FIG. 2 is an isometric view of the housing assembly of FIG. 1, with a lid being opened.
Figure 3:
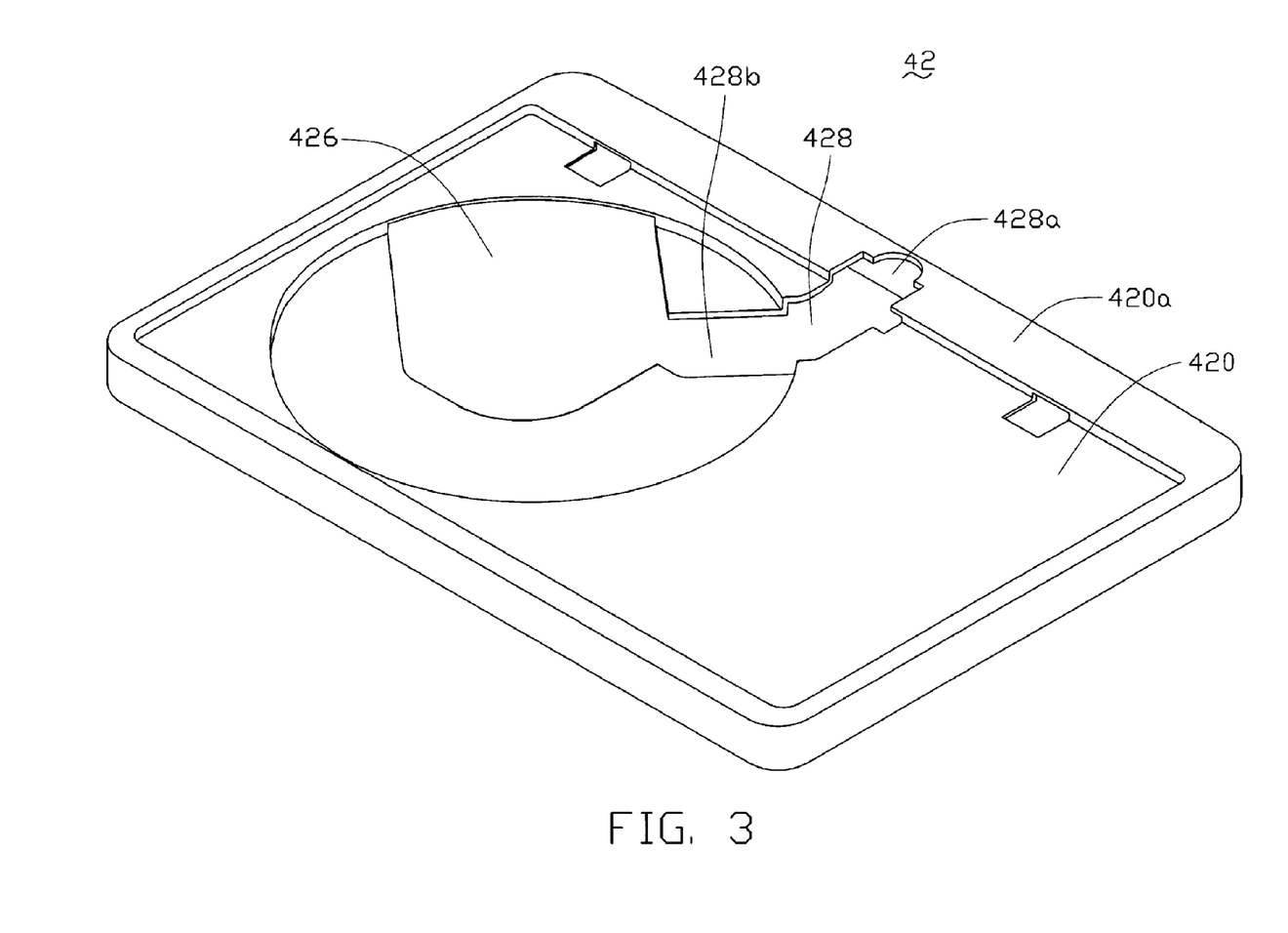
FIG. 3 is an isometric view of an upper case of FIG. 2, with a cover sheet being removed.
Figure 4:
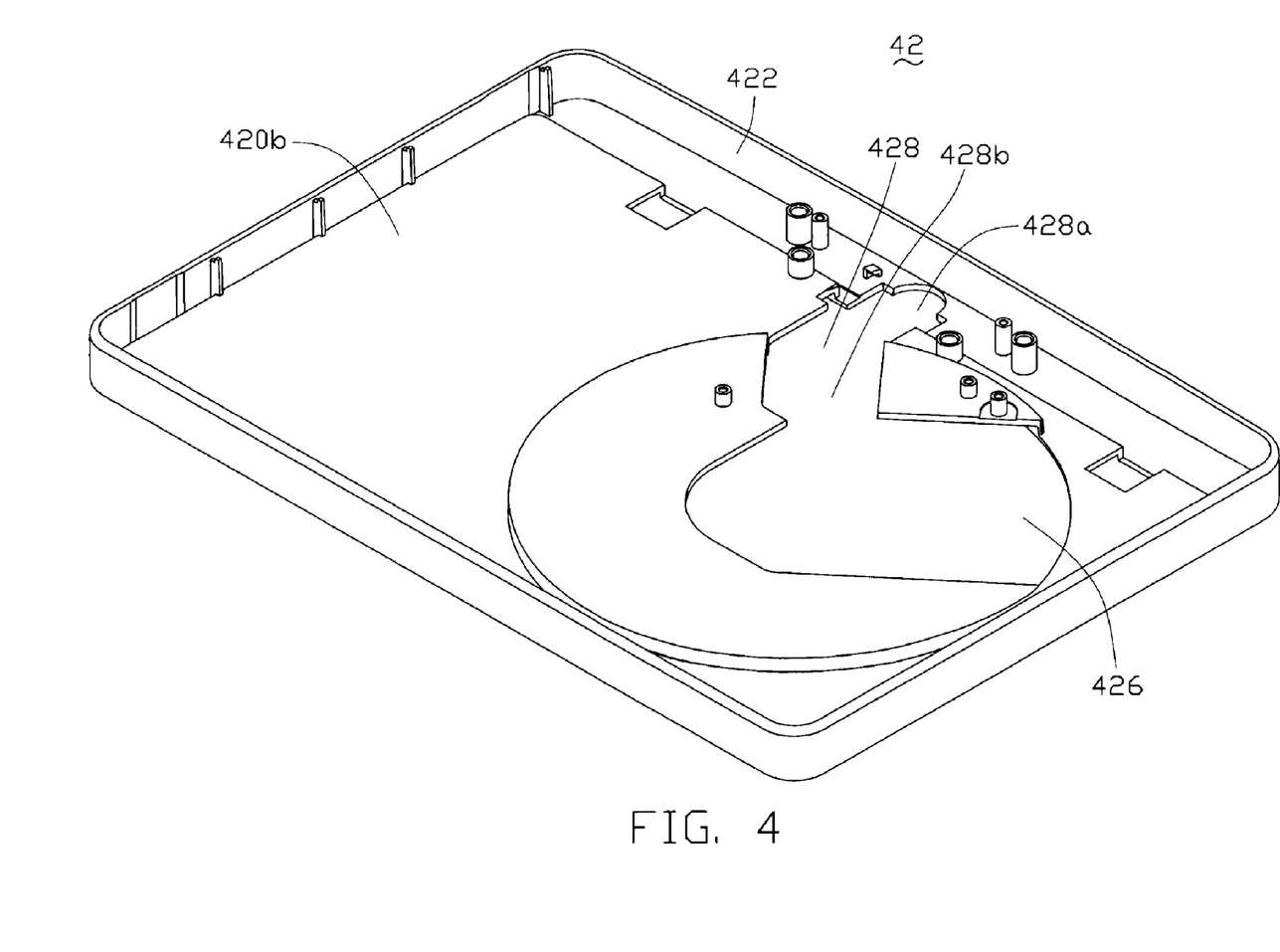
FIG. 4 is an inversed, isometric view of the upper case of FIG. 3.

Referring also to FIGS. 2 through 4, the base 40 includes an upper case 42, a lower case 44 coupled to the upper case 42, and a lid 46 pivotally mounted on the upper case 42 for shielding the disk thereunder. The upper case 42 includes an upper plate 420, a rear wall 422 and a cover sheet 424. The rear wall 422 substantially perpendicularly extends from peripheries of the upper plate 420. A pickup window 426 is defined in the upper plate 420.

Referring also to FIG. 3, the upper plate 420 includes a rear side 420a where the lid 46 is pivotally mounted. An opening 428 is defined in the upper plate 420 and shielded by the cover sheet 424. The opening 428 includes a first end portion 428a and an opposite second end portion 428b. The first end portion 428a is adjacent to the rear wall 422 and constructed as a semicircle. The second end portion 428b communicates with the pickup window 426.

Figure 5:
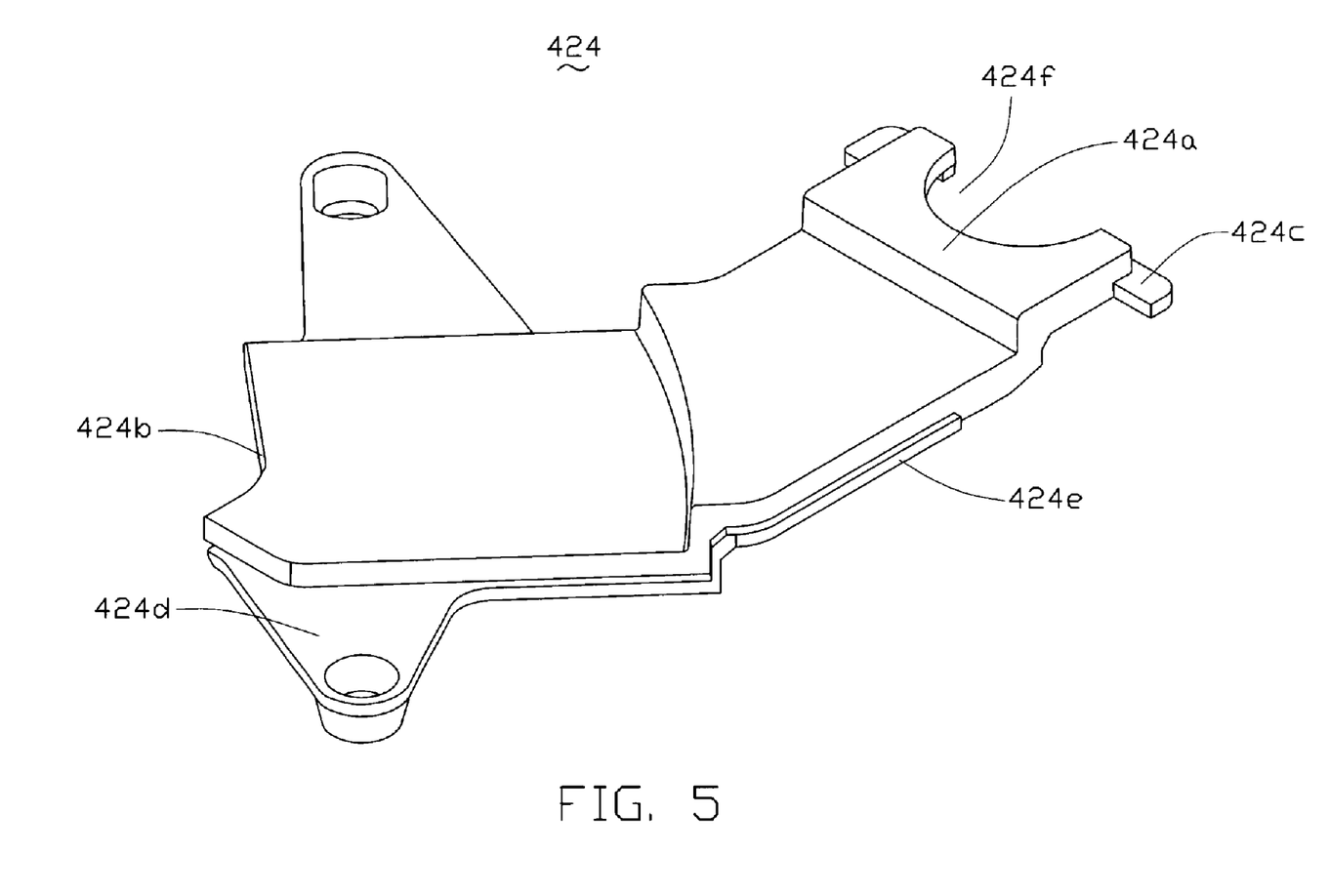
FIG. 5 is an isometric view of the cover sheet of FIG. 2.
Figure 6:
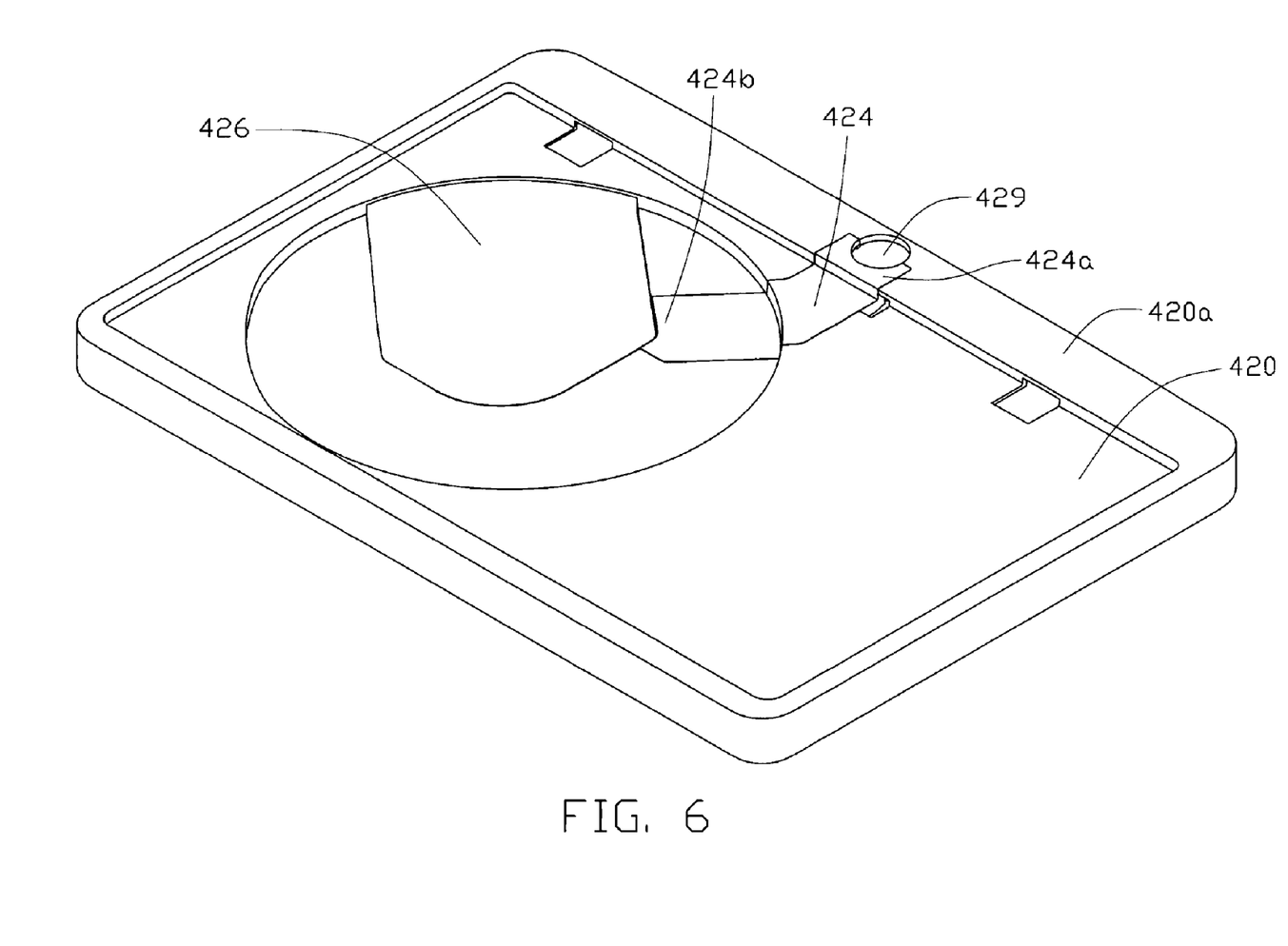
FIG. 6 is an isometric view of the upper case of FIG. 2.

Referring also to FIGS. 5 and 6, the cover sheet 424 includes a third end portion 424a and an opposite fourth end portion 424b. The third end portion 424a corresponds to the first end portion 428a. A lug 424c extends out each side of the third end portion 424a. A wing sheet 424d extends out each side of the fourth end portion 424b. The cover sheet 424 can be attached to an underside 420b of the upper case 42 via the lug 424c and the wing sheet 424d. Flanges 424e extend out from a periphery of the cover sheet 424 for engaging with edges that bounds the opening 428. The third end portion 424a defines a semicircular cutout 428f corresponding to the first end portion 428a of the opening 428. A cutout 424f is defined in the third end portion 424a. The cutout 424f connects to the first end portion 428a so that a fixing hole 429 is defined therebetween.

Figure 7:
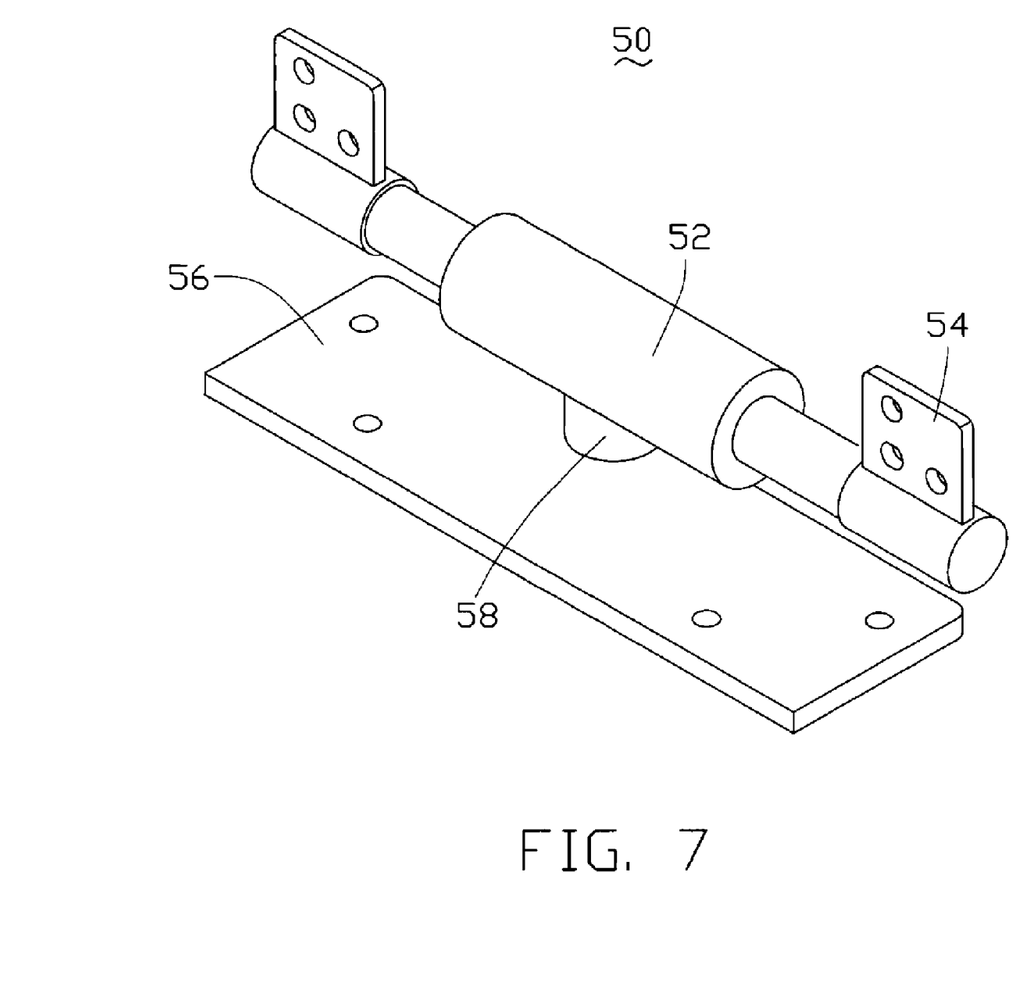
FIG. 7 is an isometric view of a hinge of FIG. 1.

Referring also to FIG. 7, the hinge module 50 includes a shaft 52, two first fixing sheets 54, a second fixing sheet 56 and a pintle 58. The two first fixing sheets 54 are pivotally arranged at two opposite ends of the shaft 52 for being secured to the cover 30. The second fixing sheet 56 is secured to the underside 420b of the upper plate 420. The pintle 58 is inserted through the opening 428 and perpendicularly interconnects the shaft 52 and the second sheet 56. The shaft 52 can be rotated around an axis of the pintle 58.

Figure 8:
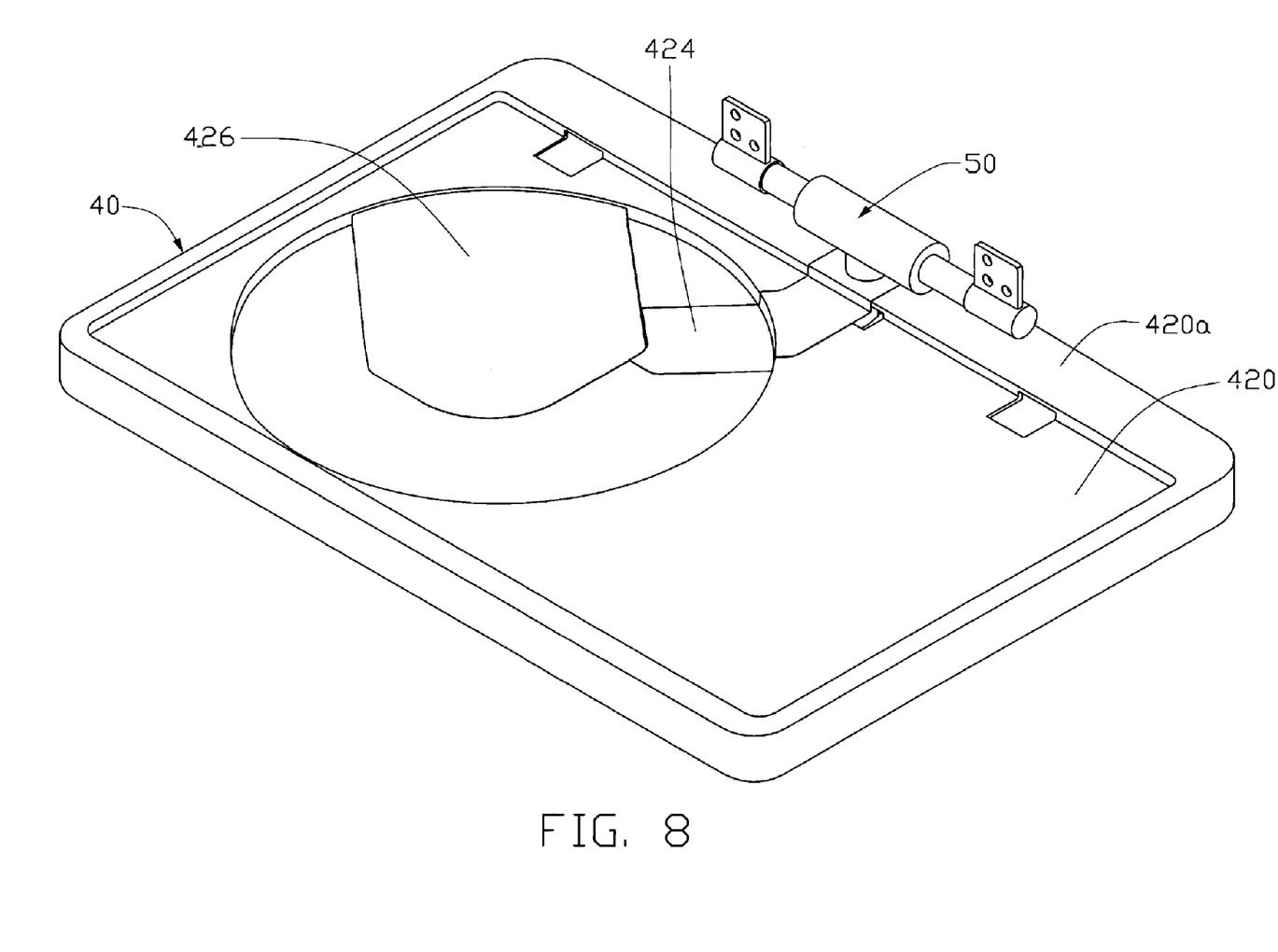
FIG. 8 is an isometric view of an assembly of the upper case and the hinge module of FIG. 3.
Figure 9:
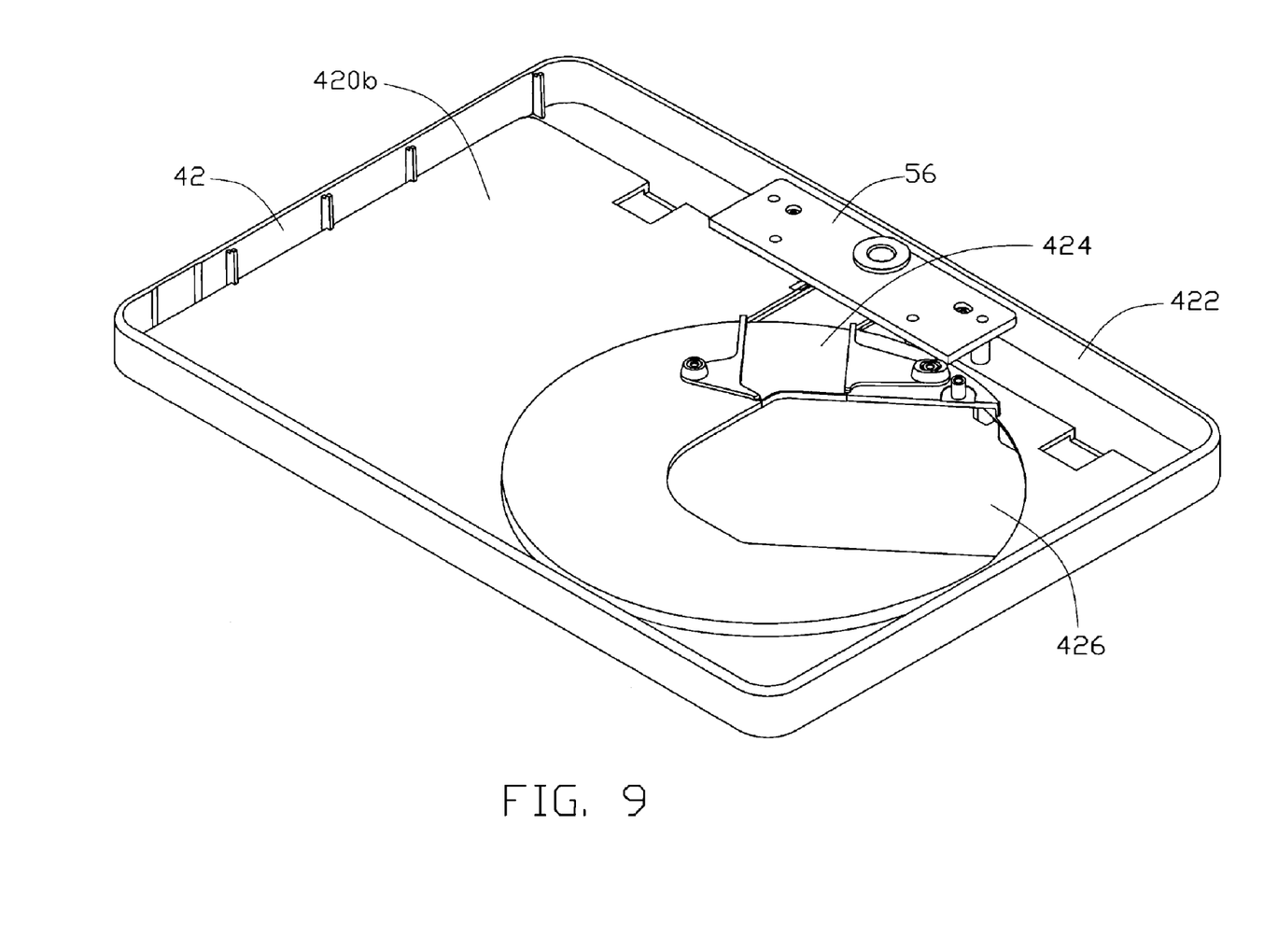
FIG. 9 is an inversed, isometric view of the assembly of the upper case and the hinge module of FIG. 8.
Figure 10:
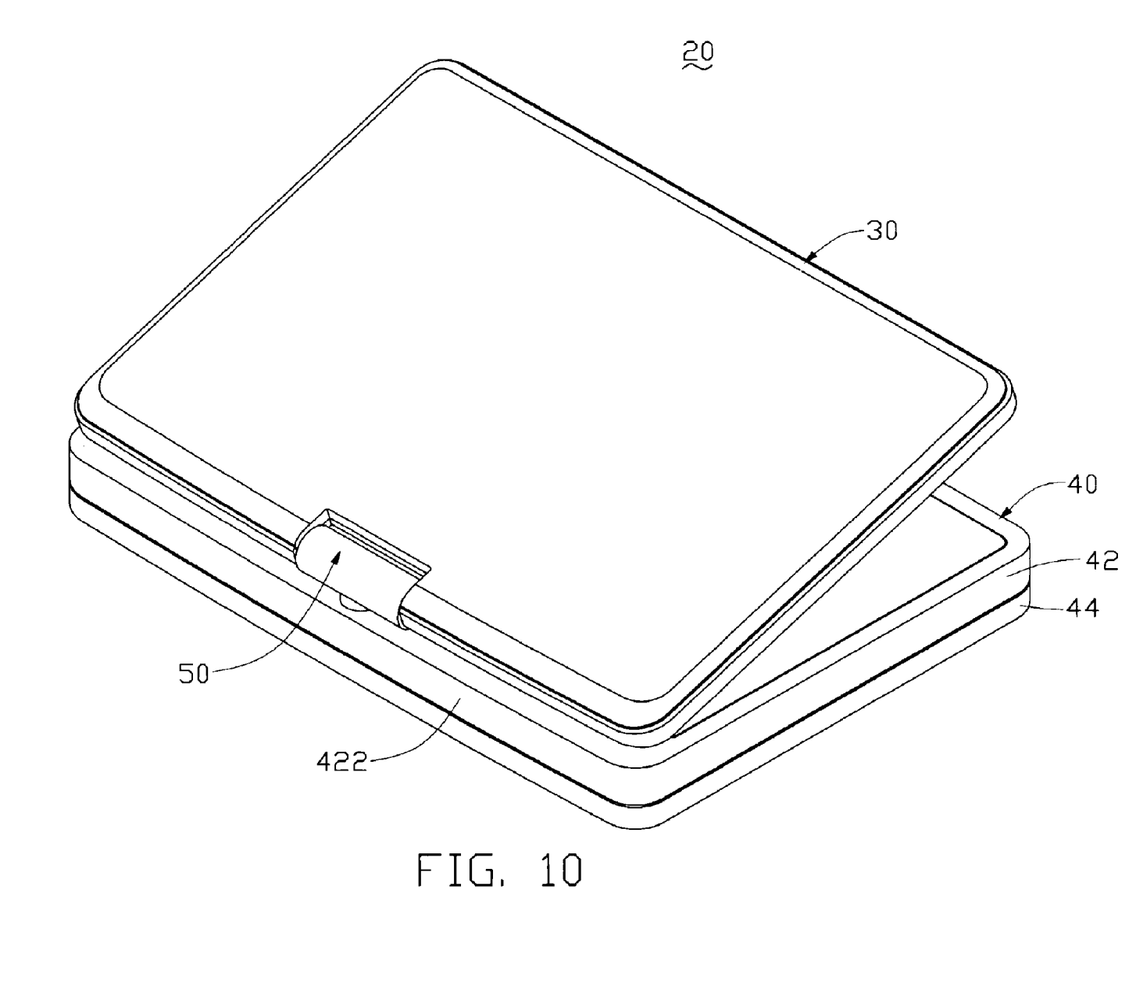
FIG. 10 is an inversed, isometric view of the housing assembly of FIG. 1.

Referring also to FIGS. 8 and 9, the hinge module 50 is assembled to the housing assembly 20 as a unit. The pintle 58 is inserted into the pickup window 426 and then is moved along the opening 428 from the second end portion 428b to the first end portion 428a. The second fixing sheet 56 follows the motion of the pintle 58. The cover sheet 424 is inserted between the second fixing sheet 56 and the underside 420b of the upper plate 420, and then secured onto the underside 420b via the two lug 424c, the two wing sheets 424d, and the flanges 424e. The second fixing sheet 56 is secured onto the underside 420b. The pintle 58 is thus positioned at the fixing hole 429. The cover 30 can rotate around an axial direction of the shaft 52, and also rotate around an axial direction of the pintle 58.

The first end portion 428a of the opening 428 and the third end portion 424a conform with a circumference of the pintle 58. The cover sheet 424 covers the opening 428, and the disk lid 46 shields the cover sheet 424 and the opening 428. The opening 428 can thus be substantially hidden from view when the pintle 58 is insert into the first end portion 428a of the opening 428. Furthermore, referring also to FIG. 9, there is no additional slit defined in an exterior of the rear wall 422. Therefore, adversely affection against aesthetic feeling of the housing assembly 20 can be well eliminated. In addition, a relatively high strength of the rear wall 422 can be achieved.

The pickup window 426 is defined for an optical pickup (not shown) to slip therein. The optical pickup can thus record/reproduce signals for the disk over the pickup window 426. Moreover, the second fixing sheet 56 can pass through the pickup window 426 before it is positioned in the fixing hole 429 if a size of the second fixing sheet 56 is too great to insert into the opening 428. Housing assemblies of other kinds of electronic devices such as a housing assembly of a notebook computer (not shown) may also be configured as the housing assembly 20. That is, the housing assembly of the notebook computer defines an opening (not shown) in the similar position where the opening 428 is defined in the housing assembly 20. A cover sheet (not shown) is also adopted to engage with the opening. Considering absence of a pickup window 426 defined in the housing assembly 20, keyboard (not shown) can be utilized to shield the cover sheet and the opening. Thus aesthetic feeling of the housing assembly and high strength of a rear wall of the housing assembly can be achieved.

The embodiments described herein are merely illustrative of the principles of the present invention. Other arrangements and advantages may be devised by those skilled in the art without departing from the spirit and scope of the present invention. Accordingly, the present invention should be deemed not to be limited to the above detailed description, but rather by the spirit and scope of the claims that follow, and their equivalents.

What is claimed is:

1. A housing assembly configured for a foldable electronic device comprising:
a base body, the base body comprising a plate having a mounting side, and a cover member, an opening being defined in the plate, the opening having a first end portion adjacent to the mounting side and an opposite second end portion communicating with the first end portion, the cover member being inserted into and partially shielding the opening, the first end portion and a side of the cover member at the first end portion cooperatively defining a fixing hole therebetween, the fixing hole being configured in a manner so as to allow a hinge module to extend therethrough.

2. The housing assembly as claimed in claim 1, wherein the cover member comprises a third end portion and an opposite fourth end portion, the third end portion defines a cutout, the cutout connects to the first end portion for defining the fixing hole.

3. The housing assembly as claimed in claim 2, wherein a pair of lugs extend out from two opposite sides of the third end portion for mounting the cover member to the base body.

4. The housing assembly as claimed in claim 2, wherein a pair of wing sheets extend out from two opposite sides of the fourth end portion for securing the cover member to the base body.

5. The housing assembly as claimed in claim 2, wherein flanges extend out from peripheries of the cover member for attaching the cover member to the base body.

6. The housing assembly as claimed in claim 2, further comprising a cover body, the hinge module pivotally interconnects the base body and the cover body, the hinge module includes a pintle received in the opening, a shaft mounted to an end of the pintle and pivotable about an axis of the pintle, the shaft includes a first fixing member attached to the secondary housing and pivotable about an axis of the shaft, and a second fixing member mounted to an opposite second end of the pintle and fixed to the primary housing.

7. The housing assembly as claimed in claim 6, wherein the cutout portion conforms to a periphery of the pintle so as to shield the opening.

8. The housing assembly as claimed in claim 1, wherein a window is defined in the plate, the second end portion communicates with the pickup window.

9. The housing assembly as claimed in claim 1, wherein a lid is pivotally coupled to the base body for shielding the opening and the cover member.

10. A housing assembly comprising:
a primary housing comprising a plate having a mounting side, and a cover member, an opening being defined in the plate, the opening having a first end portion adjacent to the mounting side, the cover member being inserted into and partially shielding the opening;

a secondary housing; and a hinge module pivotally interconnecting the primary housing and the secondary housing, the hinge module being inserted through the opening and engaging with the secondary housing in a manner so as to prevent the hinge module from becoming disengaged from the opening.

11. The housing assembly as claimed in claim 10, wherein the hinge module includes a pintle received in the opening, a shaft mounted to an end of the pintle and pivotable about an axis of the pintle, the shaft includes a first fixing member attached to the secondary housing and pivotable about an axis of the shaft, and a second fixing member mounted to an opposite second end of the pintle and fixed to the primary housing.

12. The housing assembly as claimed in claim 11, wherein the cover member comprises a third end portion and a fourth end portion, the third end portion defines a cutout portion conforming to a periphery of the pintle, the cutout portion connects to the first end portion to define a fixing hole for insertion of the pintle therethrough.

13. The housing assembly as claimed in claim 12, wherein a pair of lugs respectively extend out from a pair of opposite sides of the third end portion, a pair of wing sheets respectively extend out from a pair of opposite sides of the fourth end portion, the lugs and the wing sheets are configured for attaching the cover member to the primary housing.

14. The housing assembly as claimed in claim 12, wherein flanges extend out from a periphery of the cover member for attaching the cover member to the primary housing.

15. The housing assembly as claimed in claim 10, wherein a window configured for signal transition is defined in the plate, the opening having a second end portion communicating with the window.

16. The housing assembly as claimed in claim 10, wherein a lid is pivotally coupled to the primary housing for shielding the opening and the cover member.

17. A method of assembling a housing assembly, the method comprising steps of:

providing a base body having a plate having a mounting side, an opening being defined in the plate, the opening having a first opening portion adjacent to the mounting side, and a second opening portion communicating with the first opening portion;

receiving a hinge module through the second opening portion with a pintle of the hinge module being received in the second opening portion and a fixing member being received in the base, wherein the fixing member is mounted to the pintle;

moving the pintle from the second opening portion to the first opening portion along the opening;

mounting a cover member to the plate in a manner so as to shield the opening; and securing the fixing member to the base body in a manner so as to prevent the pintle from becoming disengaged from the opening.

18. The method of assembling the housing assembly as claimed in claim 17, further comprising the step of pivotally coupling a lid to the base body for shielding the opening and the cover member.

19. The method of assembling the housing assembly as claimed in claim 17, further comprising the step of locating a shaft of the hinge module into a cover body for pivotally interconnecting the cover body and the base body, wherein the shaft is substantially perpendicularly secured to the pintle.

* * * * *